United States Patent [19]
Silverthorn et al.

[11] Patent Number: 5,918,028
[45] Date of Patent: Jun. 29, 1999

[54] APPARATUS AND METHOD FOR SMART HOST BUS ADAPTER FOR PERSONAL COMPUTER CARDS

[75] Inventors: Lee Silverthorn, Paradise Valley; Jack Lee Anderson, Scottsdale, both of Ariz.

[73] Assignee: Motorola, Inc., Schaumburg, Ill.

[21] Appl. No.: 08/889,726

[22] Filed: Jul. 8, 1997

[51] Int. Cl.⁶ .................................................. G06F 13/00
[52] U.S. Cl. ........................ 395/309; 395/283; 395/282; 395/842; 395/735; 395/847
[58] Field of Search .................... 395/281–283, 395/309, 284, 285, 830, 833, 842, 847, 853, 857, 858, 868, 883, 735, 741, 742

[56] References Cited

U.S. PATENT DOCUMENTS

| | | | |
|---|---|---|---|
| 5,608,876 | 3/1997 | Cohen et al. | 395/281 |
| 5,664,197 | 9/1997 | Kardach et al. | 395/728 |
| 5,724,529 | 3/1998 | Smith et al. | 395/309 |
| 5,748,945 | 5/1998 | Ng | 395/500 |
| 5,754,884 | 5/1998 | Swanstrom | 395/842 |
| 5,768,542 | 6/1998 | Enstrom et al. | 395/284 |
| 5,774,680 | 6/1998 | Wanner et al. | 395/290 |

*Primary Examiner*—Ayaz R. Sheikh
*Assistant Examiner*—Raymond N Phan
*Attorney, Agent, or Firm*—Frank J. Bogacz

[57] ABSTRACT

A system is shown to improve data transfer between computers and PC Cards, which have a Host Bus Adapter (HBA). Previous HBA designs are limited in routing interrupts to the system and transferring data. The Smart HBA (150) detects an interrupt, alerts a target controller of the interrupt and provides a vector to the PC Card driver. This also eliminates acknowledgment routines and saves bus cycles. To each PC Card it appears that it is interfacing directly to its software driver. The command handling feature allows bus agents to communicate between fast access devices without using Peripheral Component Interconnect (PCI) commands that cannot be posted. Thus all commands can be posted in PCI bridges, no bus accesses have to wait for arbitration across multiple busses and no slow devices require a retry. Direct memory access (DMA) operations can be performed by legacy PC Cards when connected to a PCI bus.

17 Claims, 2 Drawing Sheets

-PRIOR ART-

APPARATUS AND METHOD FOR SMART HOST BUS ADAPTER FOR PERSONAL COMPUTER CARDS

STATEMENT OF GOVERNMENT RIGHTS

This invention was made with government support under Contract No. F30602-95-C-0026 awarded by the U.S. Air Force. The Government has certain rights in this invention.

BACKGROUND OF THE INVENTION

The present invention pertains to computer cards and more particularly to a smart host bus adapter for PC Cards.

PC Cards are credit card size devices that are designed to add functionality to portable equipment and personal computer (PC) systems. Originally the PC Cards were memory cards that were typically implemented as virtual floppy disks. Now PC Cards come in a wide variety of memory and input/output (I/O) devices and are designated as 16-bit PC Cards or as CardBus PC Cards.

PC Cards are often multi-functional type devices. The interface to the host system requires several layers of software and hardware that allow cards to be inserted and removed without turning off power to the computer. When installed, the functions on the PC Card are usually automatically included in the PC system without any need for user intervention.

PC Card hardware and software are designed to operate in the PC environment. A PC is a personal computer that is compatible with the original IBM PC and IBM PC/AT computers. The PC architecture employs a single host and an expansion bus or busses for input and output (I/O) operations. The first IBM PC had an I/O bus that evolved into the Industry Standard Architecture (ISA) bus. Current PC practices require an ISA I/O expansion bus which has a peripheral interrupt controller (PIC) function inside the ISA interface for handling all interrupts and a 8237 Direct Memory Access Controller (DMAC) function to perform third party direct memory access (DMA) transfers. ISA bus transfers are limited to one byte or to one 16-bit word at a time.

Higher performance PC systems include a hierarchy of expansion busses to interface to the system a wide variety of peripherals with differing levels of performance. Computer busses are interconnected by means of bridge devices that allow the busses to communicate with each other. In operating environments where it is necessary to expeditiously transfer large blocks of data between multiple subsystems, the PC industry has adopted the Peripheral Component Interconnect (PCI) expansion bus. The PCI bus has a throughput that is about twenty times that of the ISA bus. The high throughput is achieved through a higher clock rate and the use of burst transfers of multiple words at a rate of one double word transfer per clock cycle.

PCI interrupts do not directly map into the PC architecture. In PC systems that incorporate the PCI bus, PCI interrupts and interrupts from agents located on the PCI bus are routed to the ISA interface function. This procedure allows the single host processor to handle interrupts in the traditional manner to assure compatibility with legacy software. The PCI bus allows multiple processors, but only one host, on a single bus.

The 16-bit PC Card is an extension of the ISA bus. Legacy 16-bit PC Cards are designed to operate in the PC environment. A 16-bit PC Card must generate an interrupt or a DMA request to initiate data transfers on a system I/O bus. Access time for most cards is optimized for the ISA bus I/O read which requires three ISA clock cycles or approximately twelve PCI bus cycles. Legacy 16-bit PC Cards can transfer no more than one 16-bit word for each access.

Newer CardBus PC Cards are extensions of the PCI bus. Response time of a CardBus PC Card for a write of one double word is a minimum of two PCI bus cycles. A read requires a minimum of one more clock than a write. CardBus PC Cards can function as initiators (bus masters) or as targets (slaves) to transfer data. Target only cards operate in a manner similar to the 16-bit PC Card. While there is no specified DMA procedure for the PCI environment, PCI agents that can perform as initiators can execute DMA transfers.

The PC Card architecture provides a "plug and play" capability that simplifies the interfaces with PC configurations for various PC users. PC Cards can be added to or removed from the host system without having to reboot. The physical interface between the PC Card and the system consists of a socket for mechanical support and a host bus adapter (HBA) to provide an electrical interface.

The software includes three levels of software interfaces: Socket Services, Card Services and the individual PC Card device drivers. Socket Services is a low level interface that masks the actual hardware implementation from the vendor's PC Card device driver. The software recognizes status changes in the socket such as insertion or removal of a PC Card and prevents the device driver from having to interface to a specific HBA.

Card services is an interface between socket services and the configuration and event notification functions of the device driver. It automatically provides the management of system resources such as mapping of the function into address space, assignment of direct memory access (DMA) resources and assignment of interrupts. After configuration the device driver provides for run-time access to the resources on the PC Card by applications and the operating system (OS).

Normally the HBA is connected to an expansion bus to provide interfaces or slots for one or two PC Cards. For systems in which the HBA interfaces to the PCI bus the HBA must also provide an interrupt interface to the ISA bus to provide compatibility for 16-bit PC Cards. The I/O-type PC Card has one interrupt line that is mapped into the ISA interrupt structure by a conventional HBA. (Client drivers for some legacy 16-bit PC Cards expect to use a specific ISA interrupt.)

The ISA interface has a peripheral interrupt controller (PIC) function for interrupt handling. There are fifteen interrupts available to the system. In a typical system as many as eleven of the interrupts are preassigned. Some ISA interrupts can be shared while others can not. Typically the PCI interrupts are shared with the ISA interrupts. The PIC requires I/O transactions with the host processor that incur long latencies on the PCI bus for each bus access.

In order to transfer data to the system from an I/O capable PC Card (one that does not have bus master capability), the card must initiate the transfer with an interrupt. A data transfer between a PC Card and any other asset must be routed through the system memory of the system host processor. What seems to be a simple transfer of data between agents on the bus requires multiple, bandwidth inefficient bus accesses that cannot be posted. A bridge can accept write data from one bus and acknowledge reception to that bus to free it to perform other transactions. The bridge temporarily stores, or posts, the data until it can be written to the next bus.

In systems that have shared interrupts and multiple bus mastering processors, the single host presents a bottleneck. Interrupt handling by a single host severely impacts the efficient use of the PCI bus.

Present HBA implementations have limited data transfer operations. The PCI bus does not support an ISA-style DMA because it cannot perform fly-by (simultaneous read and write) transfers that are required to interface with the legacy DMAC. These implementations also limit the number of HBAs that can be accommodated in a system.

Accordingly, it would be advantageous to have a smart host bus adapter for PC Cards that gives a legacy card in a Smart HBA slot the same level of performance as a PCI bus master without putting a processor in the HBA, plus eliminate transaction latencies that are caused by transactions that cannot be posted.

DESCRIPTION OF THE PREFERRED EMBODIMENT

Figure 1:
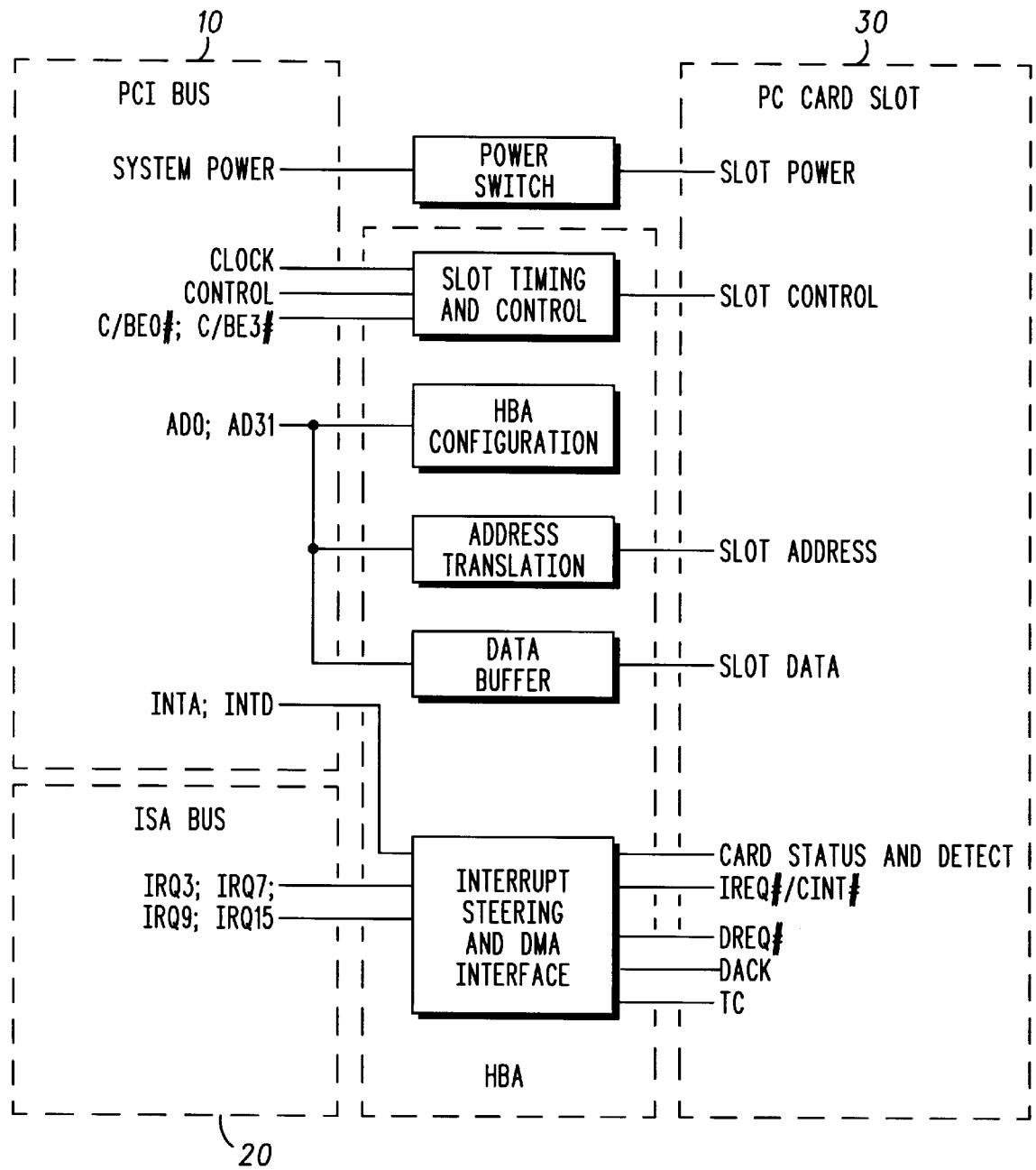
FIG. 1 is a block diagram of a prior art Host Bus Adapter for personal computer cards.

In accordance with the present invention, a novel apparatus for a Smart Host Bus Adapter (Smart HBA) to seamlessly interface with personal computer cards is shown. First, prior art, as shown in FIG. 1, will be presented in order to facilitate the discussion on the invention.

The Smart HBA is targeted for use in personal computer (PC) systems that feature an open architecture and a modular design for both the hardware and software. Previous systems include multiple Peripheral Component Interconnect (PCI) busses 10, Industry Standard Architecture (ISA) busses 20, and multiple independent controllers for the PC Card slot 30.

In these systems, sets of modules are configured into independent subsystems that share a common set of PCI busses 10. It is intended that all system resources be included on PC cards so that, with a minimum of effort, systems can be reconfigured for a variety of different functions or upgraded with the latest technology.

Figure 2:
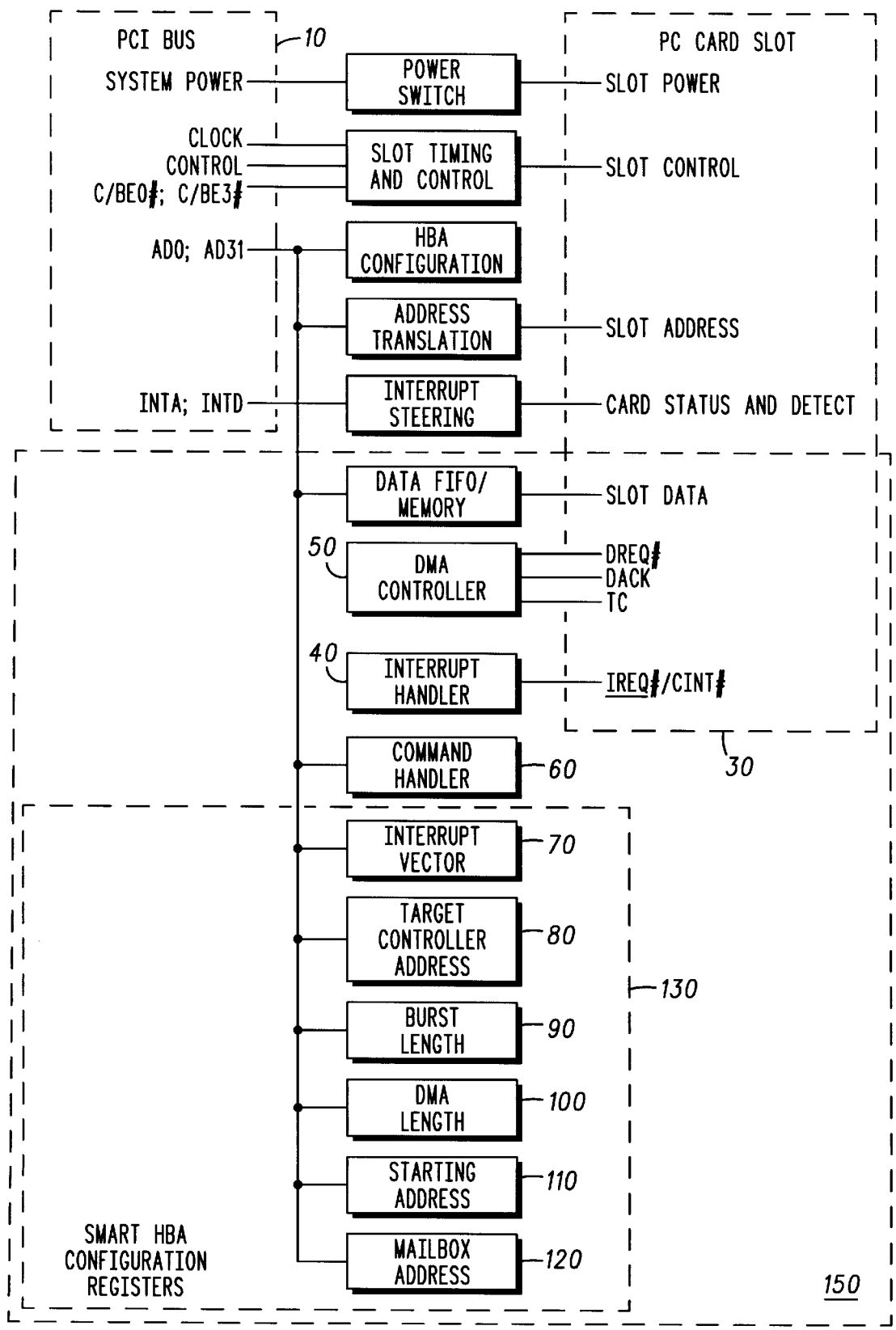
FIG. 2 is a block diagram of a Smart Host Bus Adapter for personal computer cards in accordance with the present invention.

The present invention includes a feature that is added to the functions of a standard HBA. Referring to FIG. 2, the Smart HBA 150 includes an interrupt handler 40, a direct memory access controller (DMAC) 50 and a command handler 60.

For each channel or PC Card slot 30 there is a state machine that is capable of the following:

generating commands upon detection of an interrupt;
decoding and executing a set of commands received from a controller;
and performing a direct memory access (DMA) function.

The commands are sent during the data phase of a peripheral component interconnect (PCI) transaction.

The Smart HBA 150 is a multiple channel device with a single port on peripheral component interconnect (PCI) busses 10. It can support simultaneous, independent operations on each channel. Each channel arbitrates for the PCI bus within the HBA. This provides the very desirable operation of the Smart HBA with minimal interaction required i.e. seamlessly interfacing with a computer such as a personal computer.

The Smart HBA has configuration registers 130 for each channel, which include an interrupt vector register 70 for directing an interrupt, a target controller address register 80, a burst length register 90, a direct memory access (DMA) length register 100, a starting address register 110 and a mailbox address register 120 for the target address.

In a system with Smart HBAs, all transactions between a Smart HBA and a target controller can occur at the PCI clock rate. All run-time transactions are executed by PCI memory write commands that can include multiple data phases and can be posted.

The interrupt handler 40 in the Smart HBA is a state machine that allows a PC Card to communicate directly with its driver, regardless of the location of the driver. This capability eliminates the single host bottleneck and the shared interrupt problem when operating in a PCI bus environment. In a system with a conventional HBA, data transfers between 16-bit PC cards and card bus PC cards without bus mastering capability and any other agent must be routed through the system memory of the system host processor.

Exception or card event interrupts are generated by the HBA and not by the PC card. These interrupts are routed to the host in the conventional manner by the PCI interrupts (INTA-INTD). The Smart HBA PCI interface functions are configurable by the host. The client driver is downloaded to the target controller by the host during the system configuration time as part of the configuration update of the independent subsystems. Programming of the each channel's configuration registers can be performed by either the host or the target controller. In a Smart HBA, PC card interrupts are routed to the target controller causing the controller to execute the client driver to perform data transfers between the PC card and the controller.

All transfers of data are controlled by the client driver residing in the smart target, leaving exception processing to be performed by the host or the smart target. This allows a system architecture which features distributed control by multiple independent processors as will be discussed below.

When an interrupt is requested by a function on a PC card, the function sets an interrupt pending bit in its configuration status registers (CSR) and asserts the PC Card interrupt signal (IREQ # or CINT#). The interrupt signal sets a bit in the Smart HBA interrupt register (in one of the HBA Configuration Registers). This bit is required if the host must service the interrupt.

The Smart HBA detects interrupts originating from a PC Card slot 30 (IREQ # or CINT#) and generates a message that indicates that an interrupt has occurred. The Smart HBA is configured to respond to a PC card interrupt by writing a message to a target controller. The message is sent over the PCI busses 10 to a target controller that is pointed to by the vector stored in the target controller address register 80. The message includes the interrupt alert and the contents of the interrupt vector register 70 which points to the location of the client driver in the target controller memory.

The interrupt vector register allows an interrupt to be directed to a controller that is not a peripheral component interconnect (PCI) host without involving the system host or requiring an interrupt service routine. The target controller may read the PC card configuration status register (CSR) by writing a command to the command handler 60. This command directs the HBA to read the PC card configuration status register (CSR) and initiates a PCI memory write command that transfers the contents of this register to the target controller.

If the interrupt request is to transfer data, the target controller executes the client driver transfer. If it is a management interrupt that cannot be serviced by the target controller, then the target controller must pass control to the host computer to do the processing of the exception.

If the PC card request is to transfer data from the target controller, the target controller responds by transferring that data from its memory to the Smart HBA Data FIFO Memory by using the PCI Memory Write command at the PCI data rate. The Command Handler state machine then translates the FIFO address to the PC Card address space and transfers the data to the function in the PC Card slot 30 at a rate controlled by the PC Card.

A request to transfer data to the target controller requires a sequence of two commands. The controller writes a read command to the Smart HBA Command Handler 60. The Smart HBA Command Handler 60 executes the read of the PC card and transfers the data to the target controller by a PCI Memory Write command. This sequence requires five PCI cycles to read a word from a legacy 16-bit PC Card versus at least ten PCI cycles that are required to read the data through a conventional HBA.

Any target controller can initiate transfers of data between it and a PC card. The controller can write data to the PC card in a Smart HBA in the same manner as it writes to a conventional HBA or it can perform a burst write of the data to the first-in-first-out (FIFO) memory 55 and the Smart HBA will transfer the data to the PC card at the write cycle timing of the card. If the transfer is one to read data from a PC card, the target controller writes a read I/O or read memory command to the Smart HBA Command Handler 60. The Smart HBA Command Handler 60 reads the data from the PC card, stores it in the data FIFO/memory 55 then initiates a write transaction to burst the data to the target controller. The Smart HBA permits burst transfers with PC Cards that normally can only support single word transfers.

A modified direct memory access controller (DMAC) 50 function is incorporated into each channel of the Smart HBA 150. The DMAC 50 permits legacy DMA functions for 16-bit PC cards. In a conventional PCI bus HBA DMA requests from a 16-bit PC card cannot be forwarded to the system DMAC. With the Smart HBA these requests are sent to the DMAC 50 which translates the requests into transactions that can be handled on the PCI bus. The DMAC functions are configured by either the host processor or the target controller when the system is configured.

If the normal mode of data transfer from a legacy PC Card to the host is by means of DMA, the Smart HBA will perform the function of a DMAC. In this scenario the PC Card contains an I/O device that is transferring data between it and the target controller memory. DMAs which transfer data from the target controller to the PC Card can be performed by the DMAC 50 but would require PCI transactions (reads) that cannot be posted. In order to eliminate reads across PCI busses 10 the DMAC can be configured to perform only writes leaving the target controller to be responsible for controlling DMA transfers between its memory and the PC Card.

The DMAC 50 transfers data from the PC card to the data FIFO/memory 55. When a data packet that equals the value in the burst length register 90 has been stored, the Smart HBA initiates a PCI transaction to burst the data to the target controller. For transfers of data from the target controller to the PC Card the DMAC 50 can execute a burst read of the target controller memory. The data is stored in the FIFO and transferred to the PC Card by the DMAC 50. This more efficiently moves the data, since it is collected into packets and burst across the. Legacy PC Cards and the legacy DMAC can support only byte or single word transfers. When all the data transferred equals the value in the DMA length register 100, the DMAC 50 generates an interrupt that the HBA transforms into a message to the target controller.

In CardBus functions DMA is supported by a controller that is included on the card. The DMAC 50 can also act as a general purpose controller to support DMA with CardBus cards that do not include a DMA controller. Operation of the DMAC 50 in this 32-bit mode is functionally the same as it is with 16-bit PC Cards.

Transaction latencies that occur when operating in a multiple PCI bus environment are minimized by not using transactions that cannot be posted. The Smart HBA enables transactions between agents to be made by memory write commands that can be posted to PCI bridges. The memory write commands allow the bridges to de-couple the busses from each other so that each bus can operate independently to improve the bandwidth and reduce the latencies of the entire system.

Each channel in the Smart HBA has a command handler 60 to decode commands when they are received. The command handler includes a register which has a length of two double words and is located in PCI memory space. The command handler can send commands to agents that are pointed to by the target controller address register. Alternatively it can be configured to send alerts or acknowledgments to a mailbox in a PCI interface function that is pointed to by the mailbox address register 120. The commands include I/O and memory requests. Each command includes a data type, the length of the data burst and an address of the data. The first double word contains the information shown in the following Table 1. The second double word contains the starting address of the data. The only restriction on the burst length is controlled by the number of bits in the field that describes length. A mailbox transaction has a length of one double word. It does not need a data address. Alerts include notifications that an interrupt has occurred and that a DMA has reached its terminal count.

TABLE 1

| Commands | Data type | Burst Length (n bits) |
| --- | --- | --- |
| Interrupt Alert | Interrupt vector. | 1 Double Word |
| Read I/O | Byte, Word, Double Word | $1\text{-}2^n\text{-}1$ Bytes; $1\text{-}2^n\text{-}1$ Words; $1\text{-}2^n\text{-}1$ Double Words |
| Read Memory | Byte, Word, Double Word | $1\text{-}2^n\text{-}1$ Bytes; $1\text{-}2^n\text{-}1$ Words; $1\text{-}2^n\text{-}1$ Double Words |

To comply with the PCI specification, the Smart HBA accepts posted transactions. Data buffers are provided for burst transfers from the PCI bus. In the Smart HBA this buffer is implemented with first-in first-out(FIFO) memory. The PCI specification requires that posted write buffers be emptied before the command handler can decode the next command. The FIFO has two independent channels. One channel transfers data from the PCI bus to the PC Card. The other channel transfers data from the PC Card to the PCI bus.

Current HBA designs that connect to the PCI bus are limited to providing interfaces for 16-bit PC cards and CardBus PC cards that route interrupts to the system interrupt hardware and transferring data between the bus and the PC card. The Smart HBA 150 detects an interrupt from the PC card and performs the interrupt controller functions of: alerting a target controller that an interrupt has occurred. In addition it provides an address of client driver that is stored in the interrupt vector register 70. These functions eliminate the need for an interrupt service routine and saves bus cycles.

The command handling feature allows bus agents to communicate between fast access devices without using PCI commands that cannot be posted. The advantages are: all commands can be posted in PCI bridges, no bus accesses have to wait for arbitration across multiple busses and there are no slow devices that could require a retry. The interrupt handler feature advantage is that accesses involving an ISA interface are eliminated.

This improvement will be realized by eliminating interrupts to the host processor.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An apparatus for a Smart Host Bus Adapter (HBA) for seamlessly interfacing computer cards with computers, said apparatus comprising:

a plurality of channel devices, each channel device including:

a single port for connecting to a peripheral component interconnect (PCI) bus;

an interrupt handler coupled to said single port;

a direct memory access controller (DMAC) device coupled to said single port;

a state machine operable to:

decode and execute a set of commands as received from a controller;

initiate commands and alert or acknowledgment messages to agents on a peripheral component interconnect (PCI) bus perform a direct memory access controller (DMAC) function, said state machine coupled to said single port;

said direct memory access controller (DMAC) device is coupled to each channel device of said plurality of channel devices for controlling memory access by said computer cards; and each of said plurality of channel devices further includes an interrupt vector register coupled to a channel device to provide a vector for interrupts.

2. An apparatus for a Smart Host Bus Adapter (HBA) for computer cards as claimed in claim 1, wherein each channel device includes said state machine for generating a command upon detection of an interrupt.

3. An apparatus for a Smart Host Bus Adapter (HBA) for computer cards as claimed in claim 1, wherein each of said plurality of channel devices further includes a starting address register coupled to a channel device to provide a starting address.

4. An apparatus for a Smart Host Bus Adapter (HBA) for computer cards as claimed in claim 1, wherein each of said plurality of channel devices further includes a target controller address register coupled to a channel device to provide an address for a target controller to store data.

5. An apparatus for a Smart Host Bus Adapter (HBA) for computer cards as claimed in claim 1, wherein each of said plurality of channel devices further includes a burst length register coupled to a channel device for storing a length for a burst of data.

6. An apparatus for a Smart Host Bus Adapter (HBA) for computer cards as claimed in claim 1, wherein each of said plurality of channel devices further includes a First-In First-Out (FIFO) memory coupled to a channel device for storing data.

7. An apparatus for a Smart Host Bus Adapter (HBA) for computer cards as claimed in claim 1, wherein each of said plurality of channel devices further includes a data memory coupled to a channel device for storing data.

8. An apparatus for a Smart Host Bus Adapter (HBA) for computer cards as claimed in claim 1, wherein each of said plurality of channel devices further includes a mailbox address register coupled to a channel device to provide a mailbox address storage for a target controller.

9. An apparatus for a Smart Host Bus Adapter (HBA) for computer cards as claimed in claim 1, wherein each of said plurality of channel devices further includes a command handler, which includes:

a command register;

and said state machine for executing a command set.

10. An apparatus for a Smart Host Bus Adapter (HBA) for computer cards as claimed in claim 1, wherein each of said plurality of channel devices further includes data buffers coupled to a channel device, said data buffers accepting posted transactions as burst transfers from a peripheral component interconnect (PCI) bus.

11. An apparatus for a Smart Host Bus Adapter (HBA) for computer cards as claimed in claim 1, wherein each of said plurality of channel devices further includes a plurality of peripheral component interconnect (PCI) busses.

12. An apparatus for a Smart Host Bus Adapter (HBA) for computer cards as claimed in claim 6, wherein each of said plurality of channel devices further includes a direct memory access (DMA) length register coupled to the channel device for storing a length of memory data to be transferred during a direct memory access (DMA) operation.

13. An apparatus for a Smart Host Bus Adapter (HBA) for computer cards as claimed in claim 12, wherein said command register is located in a peripheral component interconnect (PCI) memory space, said command register coupled to said plurality of channel devices.

14. A method to improve functionality of computer cards in a computer system between a Smart Host Bus Adapter (HBA) and portable equipment, said method comprising the steps of:

generating commands upon detection of a computer interrupt;

decoding a set of commands received from a computer controller;

executing a set of commands received from a computer controller;

performing a direct memory access (DMA) control function on data; and arbitrating between channels and peripheral component interconnect (PCI) busses.

15. A method to improve functionality of computer cards in a computer system between a Smart Host Bus Adapter (HBA) and portable equipment, as claimed in claim 14, wherein said generating commands step further includes a step of sending said set of commands during a data phase of a peripheral component interconnect (PCI) transaction.

16. A method to improve functionality of computer cards in a computer system between a Smart Host Bus Adapter (HBA) and portable equipment, as claimed in claim 14, wherein said method further includes a step of operating a plurality of channels simultaneously and independently of each other comprising the steps of:

generating commands upon detection of computer interrupts;

decoding said set of commands received from said computer controller to generate a set of decoded commands;

executing said set of decoded commands; and performing said direct memory access (DMA) control function on data.

17. A method to improve functionality of computer cards in a computer system between a Smart Host Bus Adapter (HBA) and portable equipment, as claimed in claim 14, wherein there is further included a step of emptying a plurality of data buffers prior to performing said decoding step.

* * * * *